United States Patent Office

3,785,961
Patented Jan. 15, 1974

3,785,961
CATALYTIC REFORMING OF A RELATIVELY LEAN CHARGE STOCK IN A TWO-STEP PROCESS
Michael W. Schrepfer, Buffalo Grove, Ill., assignor to Universal Oil Products Company, Des Plaines, Ill.
No Drawing. Continuation-in-part of application Ser. No. 860,826, Sept. 24, 1969, now Patent No. 3,617,522. This application Sept. 14, 1971, Ser. No. 180,471
The portion of the term of the patent subsequent to Nov. 2, 1988, has been disclaimed
Int. Cl. C10g 35/08
U.S. Cl. 208—139                17 Claims

ABSTRACT OF THE DISCLOSURE

A relatively lean hydrocarbon charge stock boiling in the gasoline range is catalytically reformed by contacting the charge stock, hydrogen and a halogen or a halogen-containing compound, in an essentially water-free reforming zone, with a highly selective reforming catalyst containing a platinum group component and a rhenium component at reforming conditions selected to produce a high octane $C_5^+$ reformate for a first period extending until the selectivity of the catalyst decreases to an unacceptable value, and, thereafter by continuously adding water or a water-producing compound to the reforming zone in an amount corresponding to about 5 to 50 wt. p.p.m. of the hydrocarbon charge stock while continuing the contacting operation. Key feature of the subject process involves a two-step operation with this platinum-rhenium catalyst wherein the first step is operated at essentially water-free conditions with halogen inclusion and wherein the second step utilizes a carefully selected amount of water to effect a substantial improvement in the operation of the process.

CROSS REFERENCES TO RELATED APPLICATIONS

This application is a continuation-in-part of my prior, copending application Ser. No. 860,826 which was filed on Sept. 24, 1969, now Pat. No, 3,617,522.

The subject of the present invention is an improved process for reforming a relatively lean, low octane hydrocarbon fraction boiling in the gasoline range using a catalyst containing a platinum group component and a rhenium component in which process a two-step procedure is used whereby water is first excluded from the environment containing the catalyst and thereafter added to this environment in a relatively small controlled amount. More precisely, the present invention pertains to the controlled use of water or a water-producing compound in a reforming process which operates on a relatively lean hydrocarbon charge stock and uses a catalyst having both a platinum group component and a rhenium component combined therewith. The present invention is based upon the finding that a reforming process for this type of charge stock which utilizes this specific catalyst can be sharply and materially improved by operating in a two-step manner wherein during the first step halogen is included but water is excluded from contact with the catalyst until degradation in performance is observed, and thereafter water is continuously introduced into the reforming zone in an amount of about 5 to about 50 weight parts per million of the hydrocarbon charge stock, calculated on an $H_2O$ basis.

It is well known in the art that the requirements for an optimum process for transforming low octane charge stocks into high octane product stocks, at minimum loss to undesired products, involves a dual-function catalyst, a reaction environment and process conditions designed to promote octane-upgrading reactions for paraffins and naphthenes. Paraffins are undoubtedly the component of gasolines that have the highest octane-improving potential, since many of the straight-chain paraffins are in the 0–50 range of the octane scale. For paraffins, the upgrading reactions are: isomerization of the relatively straight-chain paraffins to more highly branched paraffins, dehydrogenation to olefins, dehydrocyclization to aromatics, and selective hydrocracking to lower molecular weight, more highly branched paraffins. Of these, the dehydrocyclization reaction is the one yielding the maximum gain in octane number and is consequently preferred. Since this dehydrocyclization reaction releases 4 moles of hydrogen, it is obviously favored by low hydrogen partial pressure and by low total system pressure.

Naphthenes, on the other hand, are not as potentially productive of octane increase as are paraffins, since the clear research octane number of most naphthenes is in the range of 65–80. Nevertheless, they are a substantial source of octane improvement via the upgrading reactions of dehydragenation to aromatics, ring isomerization, etc. Since 1 mole of naphthene will typically produce 1 mole of aromatics and 3 moles of hydrogen, these reactions are similarly favored by low hydrogen partial pressure and by low total system pressure.

Besides these upgrading reactions, it is clear that a substantial number of other reactions are simultaneously proceeding, to some extent, in a typical reforming operation. These, as is true with any complex set of reaction mechanisms, are injected into the over-all picture by the uncontrollable side phenomena that are produced by a myriad of factors that color and complicate the actual operation of a real process. Examples of these side reactions are: demethylation and dealkylation of alkylaromatics and alkylnaphthenes; ring-opening of naphthenes, excessive hydrocracking of aliphatics to light gases; thermal cracking of non-aromatic hydrocarbons; dehydrogenation and condensation of aromatics to form polynuclear aromatics which are carbonaceous deposit precursors; acid-catalyzed polymerization and alkylation with olefins and other highly reactive components to yield high molecular weight products which, after further dehydrogenation, can contribute to the carbonization of the catalyst, etc. For purposes of discussion here, these side reactions are conveniently divided into those that are associative such as condensation, polymerization, etc., and those that are dissociative such as cracking and hydrocracking. The associative reactions are generally the chief culprits in the observed principal mechanisms of catalyst deactivation in reforming: the formation of carbonaceous deposits on the catalyst. It is clear that these association reactions are generally net producers of hydrogen and are consequently promoted by low hydrogen partial pressure and low system pressure. On the other hand, it is evident that the dissociation reactions generally consume hydrogen and are promoted by high hydrogen partial pressure. Hence it is evident that a preferred operation for a catalytic reforming operation involves using as low a pressure as is consistent with maintaining catalyst activity.

Extensive studies have shown that in order to accelerate these upgrading reactions while simultaneously holding the side reactions reasonably in check, a dual-function catalyst containing a hydrogenation-dehydrogenation function and an acid-acting function is necessary. In fact, a catalyst containing a platinum group component combined with an acid-acting support has achieved a dominant position in this art. Recently, there has been developed a markedly superior dual-function bimetallic catalyst which, in addition to the platinum group component, contains a rhenium component both of which are combined with a halogen-containing alumina carrier material. Extensive commercial experience with this catalyst has established that it enables several significant and material improvements in a reforming process such as increased yield of $C_5^+$ reformate, increased hydrogen production, increased throughput, and, most importantly, vastly improved stability characteristics under the preferred low pressure condition. Coupled with the development of this catalyst was the recognition of the detrimental effects of small amounts of water on the performance of the reforming process using this catalyst. In fact, it had been thought to be a firm principle that this catalyst responded adversely to the presence of water in the environment containing same, and it was highly desirable to operate a reforming process using this catalyst at a relatively low water level with the benefits from this water-exclusion feature obtained in direct proportion to the degree that water was excluded from the process. To this end, a number of commercial operations using this catalyst have been designed to operate at extremely low water levels. In general, the results experienced with this catalyst where water has been excluded from the reforming operation can be described as excellent, with but one small remaining problem area: the reforming of relatively lean charge stocks. By the expression "relatively lean" it is meant that the total cyclic content of the charge stock is less than 50 volume percent; that is, the volume percent amount of naphthenes and of aromatics in this charge stock is less than 50. In a super-dry operation with this recently developed catalyst where a relatively lean charge stock is processed, some degradation of performance of this catalyst has been noted after the process has been onstream for a substantial period of time. More specifically, it has been observed in the particular case of reforming a relatively lean charge stock with this catalyst in a dry operation, that after a substantial period of operation, $C_5^+$ yield tends to go unstable, hydrogen purity and hydrogen production tend to drop and stabilizer off-gas increases. This degradation of performance with these relatively lean charge stocks has not been observed with other types of charge stocks where uniformly good results have been obtained with this catalyst.

The problem addressed by the present invention is, accordingly, to eliminate these adverse effects associated with the reforming of a relatively lean charge stock using this platinum-rhenium catalyst.

Based upon an extensive investigation of the effect of water on the performance of this platinum-rhenium catalyst with these relatively lean charge stocks, I have now discerned that an effective solution to this problem involves a two-step operation wherein the process is operated in an essentially water-free condition with inclusion of halogen or a halogen-containing compound for a first period extending until some substantial degradation in performance is noted; thereafter, a controlled amount of water or equivalent is continuously injected into the reforming zone in order to sustain the superior performance of this bimetallic catalyst during a second period of operation. More specifically, I have ascertained that the addition of a controlled amount of water at the inception of this period of catalyst instability enables the catalyst to sustain its superior performance characteristics for an additional substantial period of time relative to the period of acceptable performance experienced if the water-free operation were allowed to continue. Judging from the effect of water addition in the manner indicated, it appears that the addition of water at this point does much more than merely suppress hydrocracking, rather it appears to restore the activity, selectivity, and stability characteristics of the catalyst to levels which more closely approximate their initial values at the start of the reforming operation. More particularly the effects of water addition in the manner indicated are: a rapid rise in $C_5^+$ yield, an increase in hydrogen purity in the recycle gas stream, a decrease in stabilizer off-gas, an increase in $C_5^+$ yield stability, and an increase in net hydrogen production.

In my prior application I disclosed a unitary process for accomplishing the solution to the problem of reforming a relatively lean charge stock using the instant bimetallic catalyst. This solution essentially involved monitoring the $C_5^+$ yield from the process in order to ascertain the onset of performance degradation of the bimetallic catalyst. While it is certainly true that $C_5^+$ yield is ultimately responsive to changes in selectivity of the catalyst, it is not as sensitive or easily measured as some other performance parameters of the process. Since fundamentally it is selectivity of the catalyst that is being degraded, the performance parameters that can be utilized to sense selectivity changes are: $C_5^+$ yield, net hydrogen production, hydrogen purity, differential temperature across the reactor, excess recycle gas make, debutanizer overhead gas make, density of recycle gas stream, carbon level on the catalyst and the like parameters. Among these possible candidates, I have now established that these are three which are extremely sensitive to selectivity change of the bimetallic catalyst and which are easily measured; these are: debutanizer overhead gas make, net hydrogen production and hydrogen purity of recycle gas stream. Accordingly, my present invention essentially involves the modification of the process described in my prior application to allow the use of one or more of the recited performance parameters in order to sense degradation in selectivity of the bimetallic catalyst, and particularly the use of debutanizer overhead gas make, net hydrogen production or hydrogen purity for this purpose. The principal advantages associated with using net hydrogen production, hydrogen purity or debutanizer overhead gas make to sense catalyst selectivity charges are: (1) measurement of these parameters is quite simple, and (2) these parameters are extremely sensitive to selectivity and tend to give an early warning of the onset of catalyst selectivity degradation.

It is, accordingly, an object of the present invention to provide an improved process for reforming a relatively lean charge stock with a platinum-rhenium type catalyst.

In brief summary, my invention in one embodiment, involves a process for catalytically reforming a relatively lean hydrocarbon charge stock boiling in the gasoline range. In the first step of the process, the charge stock, hydrogen, and halogen or a halogen-containing compound are contacted in an essentially water-free reforming zone with a bimetallic group component, a rhenium component and a halogen component with an alumina carrier material, at reforming conditions selected to produce a high octane $C_5^+$ reformate, a hydrogen stream and a debutanizer overhead gas stream. The amount of halogen or halogen-containing compound added to the forming zone during this first step corresponds to about 0.1 to about 5 wt. p.p.m. of the charge stock, calculated on an elemental halogen basis. The duration of this first step extends until the selectivity of the catalyst decreases to an unacceptable value. Thereafter, in the second step, water or a water-producing compound is continuously added to the reforming zone in an amount corresponding to about 5 to about 50 wt. p.p.m. of the hydrogen charge stock, calculated on $H_2O$ basis. Of course, the contacting operation described in the first step is continued during the second step. The effects of this combination dry operation followed by a wet operation are an immediate increase in $C_5^+$ yield and selectivity of the catalyst and a substantial increase in the $C_5^+$ yield stability characteristics of the catalyst, thereby enabling the operation to continue an additional substantial period of time at a relatively high $C_5^+$ yield.

Another embodiment of the present process involves a process as described in the first embodiment wherein the selectivity decrease of the catalyst is measured by monitoring the increase in debutanizer gas make and changing to the second step of the process when the debutanizer gas make reaches 150% or more of the value it had at the start of the first step.

Yet another embodiment involves a process as described in the first embodiment wherein the selectivity decrease of the catalyst is measured by monitoring the decrease in purity of the hydrogen product stream and changing to the second step when the hydrogen purity has declined to a level of about 95% or less of the value it had at the start of the first step.

Still another embodiment involves a process as described in the first embodiment wherein the selectivity decrease of the catalyst is measured by monitoring the decrease in net hydrogen production and switching to the second step when the net hydrogen production has fallen to a value of about 95% or less of the value it had at the start of first step.

Other objects and embodiments of the present invention relates to details about: the relatively lean charge stocks that are processed therein, the water additives that are preferably utilized to achieve the desired amount of water, the composition of the bimetallic reforming catalyst that is employed, the mechanisms of injecting and maintaining the water level therein, the procedures for obtaining an essentially water-free operation, and the like particulars. These are discussed hereinafter in the following detailed explanation of each of these facets of the present invention.

The relatively lean charge stocks that can be reformed in accordance with the process of the persent invention comprise gasoline fractions containing naphthenes, aromatics and paraffins. As mentioned hereinbefore, it is an essential feature of the present invention that the total cyclic content of the charge stock be less than 50 volume percent. Typically, the present invention gives excellent results with charge stocks having very low cyclic contents of the order of about 10 to about 35 volume percent. These relatively lean charge stocks can include straight-run gasolines, natural gasolines, synthetic gasolines and the like charge stock provided this limitation on cyclic content is met. In some cases, it is advantageous to charge thermally or catalytically cracked gasolines and mixtures of straight-run and cracked gasolines and various other mixtures well known to those skilled in the art. The relatively lean charge stock may be a full boiling range gasoline having an initial boiling point of about 50 to about 100° F. and an end boiling point within the range of from about 250 to about 424° F., or it may be a selected fraction thereof which usually will be a higher boiling fraction commonly referred to as a heavy naphtha. It is also within the scope of the present invention to charge to the present invention pure paraffins or mixtures of paraffins and naphthenes which boil in the gasoline boiling range and are to be converted to aromatics.

The relatively lean charge stock for the process of the present invention must be carefully controlled in the areas of concentration of sulfur-containing compounds, nitrogen-containing compounds and of oxygen-containing compounds. In general, it is essential that the concentration of all of these constituents be reduced to low levels by any suitable pretreating means such as a mild hydrogenation treatment (e.g. hydrorefining, hydrotreating, hydrodesulfurization and the like processes). Typically, this pretreatment operation involved contacting the charge stock and hydrogen with a suitable supported cobalt and/or molybdenum catalyst at hydrotreating conditions. The details associated with these hydrotreating operations are well known to those skilled in the art. This requirement for hydrotreating is mentioned here to emphasize that the level of these contaminants in the charge stock must be reduced to a low level. In the case of the sulfurous and nitrogenous contaminants, this level should be less than 1 and preferably less than 0.5 wt. p.p.m. of sulfur and nitrogen, respectively, of the hydrocarbon charge stock. Likewise, the amount of water-producing compounds contained in this charge stock must be reduced to at least 2 wt. p.p.m., calculated as equivalent water and preferably less than 1 wt. p.p.m.

The bimetallic reforming catalyst utilized in the present invention comprises an alumina carrier material having combined therewith a platinum group component, a rhenium component, and a halogen component. Considering first the alumina carrier material, it is preferred that it be a porous, adsorptive high surface area support having a surface area of about 25 to 500 or more m.$^2$/g. Suitable alumina materials are the crystalline aluminas known as gamma-, eta-, and theta-alumina, with gamma-alumina giving best results. In addition, in some embodiments the alumina carrier material may contain minor proportions of other well-known refractory inorganic oxides such as silica, zirconia, magnesia, etc. However, the preferred support is substantially pure gamma-alumina. In fact, an especially preferred carrier material has an apparent bulk density of about 0.3 to about 0.7 g./cc. and has surface area characteristics such that the average port diameter is about 20 to about 300 angstroms, the pore volume is about 0.1 to about 1 ml./g., and the surface area is about 100 to about 500 m.$^2$/g. A preferred method for manufacturing this preferred alumina carrier material is given in U.S. Pat. No. 2,620,314.

One essential constituent of the bimetallic reforming catalyst is a halogen component. Although the precise form of the chemistry of the association of the halogen component with alumina carrier material is not entirely known, it is customary in the art to refer to the halogen component as being combined with the alumina or with the other ingredients of the catalyst in the form of the halide (e.g. as the chloride or the fluoride). This combined halogen may be either fluorine, chlorine, iodine, bromine, or mixtures thereof. Of these, fluorine, and chlorine are preferred for the purposes of the present invention. The halogen may be added to the alumina carrier material in any suitable manner, either before, during or after the addition of the other components. For example, the halogen may be added as aqueous solution of a water-soluble, halogen combining compound as ammonium chloride, sodium chloride, hydrogen fluoride, hydrogen chloride, hydrogen bromide, and the like compounds. In addition, the halogen or a portion thereof may be combined with the alumina during the impregnation of the latter with the platinum group component; for example, through the utilization of a mixture of chloroplatinic acid and hydrogen chloride. In another situation, the alumina hydrosol which is typically utilized to form the alumina carrier material may contribute at least a portion of the halogen component to the final composite. In any event, the halogen will be typically added in such a manner as to result in a final composite containing about 0.1 to about 1.5 wt. percent and preferably about 0.4 to about 1.25 wt. percent of halogen, calculated on an elemental basis. Best results are ordinarily obtained where the halogen component is chlorine or a compound of chlorine.

The bimetallic reforming catalyst also contains a platinum group component. Although the process of the present invention is specifically directed to the use of a catalytic composite containing platinum or a compound of platinum it is intended to include other platinum group metals such as palladium, rhodium, ruthenium, osmium etc. The platinum group component, such as platinum, may exist within the final catalytic composite as a compound such as an oxide, sulfide, halide, etc., or as an elemental metal. Generally, the amount of the platinum group component present in the final catalyst is small compared to the quantities of the other components combined therewith. In fact, the platinum group component generally comprises about 0.05 to about 1 wt. percent of the final catalyst calculated on an elemental basis. Excellent results are obtained when the catalyst contains about 0.1 to about 0.9 wt. percent of the platinum group metal.

The platinum group component may be incorporated in the catalyst in any suitable manner such as coprecipitation or cogellation with the alumina carrier ion-exchange with the alumina carrier and/or alumina hydrogel or impregnation of the alumina carrier at any stage in its preparation either before, during or after its calcination treatment. The preferred method of preparing the catalyst involves the utilization of water-soluble compounds of the platinum group metals to impregnate the alumina carrier material. Thus, the platinum group metal may be added to the alumina carrier by commingling the latter with an aqueous solution of chloroplatinic acid. Best results are ordinarily achieved when the platinum group component is impregnated simultaneously with the rhenium component as is explained below.

Another essential constituent of the bimetallic catalyst is the rhenium component. This component may be present as an elemental metal, as a chemical compound such as the oxide, sulfide, halide, or in physical or chemical association with the alumina support and/or the other components of the catalyst. Generally, the rhenium component is utilized in an amount sufficient to result in a final catalyst containing about 0.05 to about 1 wt. percent rhenium calculated as an elemental metal. Generally, best results are obtained when the amounts of the rhenium and platinum group components are related to result in an atomic ratio of platinum group metal to rhenium of about 1:1 to about 5:1. The rhenium component may be incorporated in the catalyst in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves the impregnation of the alumina carrier material. The impregnation solution can comprise an aqueous solution of a suitable rhenium salt such as ammonium perrhenate, sodium perrhenate, rhenium chloride, etc. However, best results are obtained with perrhenic acid. The rhenium component can be impregnated either prior to, simultaneously with or after the platinum group component is added to the support. In general, best results are achieved when the rhenium component is impregnated simultaneously with the platinum group component. In fact, a preferred procedure involves using an impregnation solution containing perrhenic acid, chloroplatinic acid and hydrogen chloride.

Regardless of the details of how the components of the catalyst are combined with th alumina carrier the final catalyst generally will be dried at a temperature of from about 200° F. to about 600° F. for a period of from about 0.5 to 4 hours or more, and finally oxidized in an air stream at a temperature of about 800° F., to about 1100° F. for a period of about 0.5 to 10 hours or more. In most cases, it is advantageous to adjust the concentration of the halogen component in the catalyst during this oxidation step by injecting into the air stream used therein, an aqueous solution of a suitable halogen-containing compound—for example, hydrogen chloride.

Thereafter, it is preferred that the resultant catalytic composite be subjected to a reduction step with substantially water-free reducing agent. This step is designed to insure a uniform and finely divided dispersion of the metallic components throughout the alumina carrier material. Preferably, substantially pure and dry hydrogen is used as the reducing agent in this step. The reducing agent is preferably contacted with the oxidized catalyst at a temperature of about 1000° F. to 1100° F., a gas hourly space velocity of about 700 hr.$^{-1}$ and for a period of about 1 to about 10 hours effective to reduce both metallic components to their elemental state.

The final step in preparation of the instant bimetallic catalytic composite usually involves subjecting the reduced catalyst to a presulfiding operation designed to incorporate in the catalytic composite from about 0.05 to about 0.5 wt. percent sulfur calculated on an elemental basis, and especially about 0.1 wt. percent. Preferably, this presulfiding treatment takes place in the presence of hydrogen and a suitable sulfur-containing compound such as hydrogen sulfide. Typically, this step comprises treating the reduced catalyst with a sulfiding gas such as a mixture of hydrogen and hydrogen sulfide having about 10 moles of hydrogen per mole of hydrogen sulfide at a temperature sufficient to effect the desired incorporation of sulfur, generally ranging from about 100° F. to 1100° F. or more. This presulfiding operation is preferably conducted under substantially water-free conditions.

According to the present invention, the first step of the subject reforming process involves contacting the charge stock, hydrogen and a halogen or a halogen-containing compound with the bimetallic catalyst in a reforming zone at reforming conditions. This contacting may be accomplished in a fixed bed system, a moving bed system, a fluidized system or a batch type operation; however, in view of the danger of the attrition losses of the valuable catalyst and of well-known operation advantages, it is preferred to use a fixed bed system. In this system, a hydrogen-rich gas and the charge stock are preheated, by any suitable heating means, to the desired reaction temperature and then are passed in admixture with halogen or a halogen-containing compound, into a reforming zone containing a fixed bed of the catalyst. It is, of course, understood that the reformng zone may be one or more separate reactors with suitable heating means therebetween to insure that the desired conversion temperature is maintained at the entrance to each reactor. It is also to be noted that the reactants are typically in vapor phase and may be contacted with the catalyst bed in either upward, downward or radial flow fashion, with the latter being preferred.

It is an essential feature of the present invention that the reforming zone is maintained essentially water-free during this first step. To achieve this condition, it is necessary to control the water level present in the charge stock and the hydrogen stream which are charged to the reforming zone. It is essential that the total amount of equivalent water entering the reforming zone from all sources be held to a level less than that equal to 5 wt. p.p.m. of the charge stock and preferably less than 2 p.p.m. In general this can be accomplished by pretreating the charge stock as explained heretobefore and by drying the charge stock with any suitable drying means known to the art such as a conventional solid adsorbent or desiccant having a high selectivity for water, for instance, silica gel, activated alumina, calcium or sodium crystalline aluminosilicates, anhydrous calcium sulfate, high surface area sodium and the like adsorbents. Similarly, the water content of the charge stock may be adjusted by suitable stripping operations in a fractionation column or like device. And in some cases a combination of adsorbent drying and distillation drying may be used advantageously to effect almost total removal of water from the charge stock. Additionally, it is preferred to dry the hydrogen stream entering the hydrocarbon conversion zone down to a level of about 5 volume p.p.m. of water or less. This can be conveniently accomplished by contacting the hydrogen stream with any suitable adsorbent or desiccant such as the ones mentioned above. The preferred drying means is calcium aluminosilicate molecular sieves having a pore size of about 5 angstroms.

Another essential feature of this first step is the continuous addition of a halogen or a halogen-containing compound to the reforming zone during the course of this step. This can be most easily accomplished by adding a halogen-containing compound to one of the streams entering the reforming zone; that is, either to the hydrocarbon charge stock or to the recycle hydrogen stream. Alternatively, the halogen-containing compound can be independently introduced into the reforming zone; however, the preferred method is to admix it with the hydrocarbon charge stock. For purposes of the present invention, it is preferred to add chlorine or a chlorine-containing compound to the reforming zone. The only significant limitations on the class of halogen or halogen-containing compounds, other than hydrogen halides, that are suitable for use in the present invention are that they must be convertible, at the conditions maintained in the reforming zone, at least in part to the corresponding hydrogen halide and that they must not contain any oxygen. Examples of suitable halogen-containing compounds are: hydrogen chloride, ammonium chloride, carbon tetrachloride, trichloromethane, tertiary butyl chloride, n-hexyl chloride, n-propyl chloride, and the like compounds. The amount of halogen added to the reforming zone is selected to correspond to about 0.1 to about 5 wt. p.p.m. of the charge stock, calculated on an elemental halogen basis. Excellent results are obtained with $C_3$ to $C_8$ alkyl chlorides in the amount indicated.

The first step is conducted at reforming conditions selected to produce a high-octane $C_5^+$ reformate. Although the pressure utilized in the reforming zone can be a pressure of about 0 to 1000 p.s.i.g., the preferred pressure range is about 50 to about 600 p.s.i.g., with best results obtained at about 100 to 350 p.s.i.g. Similarly, the temperature maintained at the inlet to the reforming zone is selected from the range of about 800° F. to about 1100° F. and preferably about 900 to about 1050° F. As is well known to those skilled in the reforming art, the initial selection of temperature within this broad range is made primarily as a function of the required octane number or aromatic content of the product reformate considering the characteristics of the charge stock and of the catalyst. Ordinarily, the temperature is thereafter slowly increased during the course of the run to compensate for the inevitable deactivation that occurs in order to produce a constant octane number product. In addition, hydrogen is charged to the reforming zone in an amount sufficient to provide a hydrogen to hydrocarbon mole ratio of about 2:1 to about 20:1, with best results ordinarily obtained at a mole ratio of about 5:1 to about 10:1. Likewise, the liquid hourly space velocity used in this step is selected from the range of about 0.1 to about 10 hr.$^{-1}$, with a value in the range of about 0.5 to about 5 hr.$^{-1}$, being preferred.

According to the present invention, this first step is conducted for a period extending until the performance of the reforming operation has deteriorated to the point where it no longer possesses the superior performance characteristics associated with this platinum-rhenium catalyst. That is, until the selectivity of the catalyst has decreased to an unacceptable value. Ordinarily the decision to change from the first step to the second step can be made by monitoring one or more of the following performance parameters: $C_5^+$ volume yield of reformate obtained from the process, net hydrogen production, hydrogen purity, differential temperature across the reaction zone, excess recycle gas make, debutanizer overhead gas make, density of recycle gas stream, carbon level on the catalyst and the like. When the value of the parameter selected to sense selectivity decay changes to an unacceptable value, this first step is terminated. One preferred procedure, as explained in my prior application, involves terminating this step when the $C_5^+$ volume percent yield has fallen to a value which is about 98% or less of the initial value of $C_5^+$ yield obtained at the start of this first step. A second preferred procedure for sensing this selectivity change involves monitoring the increase in debutanizer overhead gas make and terminating the first step when the debutanizer overhead gas make has increased to a value of about 150% or more of the value it had at the start of this first step. A third preferred procedure for sensing the onset of catalyst degradation in an on-stream reforming process comprises monitoring the decrease in purity of the hydrogen product stream and switching to the second step when hydrogen purity has dropped to a value corresponding to 95% or less of the value it had at the start of the first step. A fourth preferred procedure for making this switch from the first step to the second step involves monitoring the decrease in net hydrogen production and starting to add water when the net hydrogen production has fallen to a value corresponding to about 95% or less of the net hydrogen production at the start of the first step.

Following the termination of this first step, a water or a water-producing compound is continuously added to the reforming zone in an amount such that the total amount of water entering the reforming zone corresponds to about 5 to about 50 weight parts per million of the hydrocarbon charge stock, calculated on a $H_2O$ basis. In general, any suitable water-producing compound can be utilized to supply the required quantity of water in this step; and these include most of the oxygen-containing organic compounds familiar to those skilled in the art. Best results are ordinarily obtained with a suitable alcohol such as a $C_2$ through $C_7$ alcohol. In many cases, water per se can be injected into the reforming zone to supply all or a portion of this required quantity of water. Regarding the method of adding water or a water-producing compound to the reforming zone, it is generally preferred to continue to carefully dry the charge stock and the recycle hydrogen stream while separately injecting the precise amount of water, or water equivalent required into the dried hydrocarbon stream. This last preference facilitates careful control of the total amount of water entering the reforming zone so that it is held within the range previously specified. On the other hand, if drying of the recycle hydrogen stream is not used, careful control of the amount of water added to the hydrocarbon stream must be practiced to insure that the equilibrium water level established in the hydrogen recycle stream plus the amount added to the hydrocarbon charge stock falls within the range specified. Except for the change from water exclusion to water inclusion, this second step is operated in the manner previously described for the first step. The principal effect of this transition from water exclusion to water inclusion with this relatively lean charge stock is to recapture the improved performance characteristics of this platinum-rhenium catalyst, which were exhibited during the initial portion of the first step. This enables the operation of the reforming process for an additional substantial period of time with these preferred performance characteristics. For example, in the typical case, the addition of water at the beginning of this second step causes a sharp jump in $C_5^+$ yield, a marked and rapid increase in hydrogen production and purity, an increase in $C_5^+$ yield stability, and a decrease in debutanizer overhead gas make.

The following examples are given to illustrate further the benefits that are derived from the present invention. These examples are intended to be illustrative rather than restrictive.

EXAMPLE I

The catalyst was prepared according to the preferred simultaneous impregnation procedure mentioned hereinbefore. It comprised a combination of platinum, rhenium, chlorine, and sulfur, with a gamma-alumina carrier material in amounts sufficient to result in the catalyst containing 0.2 wt. percent platinum, 0.2 wt. percent rhenium, 0.85 wt. percent chlorine and 0.1 wt. percent sulfur. It was used in the form of 1/16" particles having an apparent bulk density of 0.52 g./ml., a pore volume of about 0.35 cc./g. and a surface area of about 160 m.$^2$/g.

The catalyst was loaded into a conventional three reactor continuous catalytic reforming plant which was operated in the conventional manner. The recycle hydrogen stream was not dried. The relatively lean charge stock was a Venezuelan naphtha having an initial boiling point of 170° F., an end boiling point of 260° F., a paraffin content of 58 volume percent, a naphthene content of 33 volume percent and an aromatic content of 9 volume percent. Thus, its cyclic content was 42 volume percent. Prior to passage to the reforming plant, the charge stock was treated in a conventional hydrotreating plant to reduce the amounts of oxygen, sulfur and nitrogen contaminants contained in the charge stock to less than 1 wt. p.p.m. in each case. In addition, the charge stock was dried prior to passage into the plant. As a result of these preliminary steps, the amount of water or water-producing compounds contained in the charge stock was less than 1 wt. p.p.m. of equivalent water.

The plant was started up and lined out at the following conditions: a pressure of 265 p.s.i.g., a LHSV of 2.0 hr.$^{-1}$, a hydrogen to hydrocarbon mole ratio of 6:1, and an average inlet temperature to the reactors which was continuously selected to yield a $C_5^+$ reformate having an F-1 clear octane number of 92.

After the plant was lined out at these conditions, a determination of the total amount of water or water-producing compounds continuously entering the reforming zone (i.e. the three reactors containing the catalyst) indicated that it was less than that equivalent to about 2 wt. p.p.m. of the charge stock. It is to be noted that this includes both the water contained in the charge and that contained in the recycle hydrogen stream as if all of it were present in the charge stock. In addition, propylene dichloride was continuously added to charge stock in an amount of about 0.25 to about 1 wt. p.p.m. Thus the plant was operated at an essentially water-free condition with halogen inclusion.

Operation in the manner indicated was conducted for a first period corresponding to a catalyst life of 36.5 barrels of charge per pound of catalyst (i.e. 4.5 months at a space velocity of 2) with the following results: an average $C_5^+$ reformate yield of about 75 volume percent charge, an average hydrogen purity in the recycle hydrogen stream of about 78 mole percent, an average net hydrogen separator gas make of about 990 standard cubic feet per barrel of charge and an average stabilizer overhead gas make of about standard cubic feet per barrel of charge.

At a catalyst life of 36.5 barrels of charge per pound of catalyst, the $C_5^+$ yield had fallen to an unacceptable level of about 70 volume percent of charge and was declining rapidly. In addition, hydrogen purity and separator gas make were declining and stabilizer overhead gas make was increasing.

At this point, water was continuously added to the charge stock in an amount of about 2.5 wt. p.p.m. Because there was no recycle gas dryer in this plant, this level of water addition in the feed causes the build up in the recycle hydrogen stream of an amount of water corresponding to about 3 times the amount added to the feed so that, after the plant reached equilibrium, the total amount of water continuously entering the reforming zone was equivalent to 10 wt. p.p.m. of the charge stock.

The effects of water addition here were an immediate increase in $C_5^+$ yield to about 73 volume percent, a marked increase in hydrogen purity and separator gas make, a decrease in stabilizer overhead gas make and a sharp increase in $C_5^+$ yield stability.

This second period wherein water was continuously added was continued for a substantial period of time and it was found that the effects of water-addition were real, permanent, and highly beneficial.

EXAMPLE II

Once again, the catalyst was prepared according to the preferred simultaneous impregnation procedure described hereinbefore. It was a combination of platinum, rhenium, chlorine and sulfur with a gamma-alumina carrier material in amounts sufficient to result in the catalyst containing 0.375 wt. percent platinum, 0.2 wt. percent rhenium, 0.85 wt. percent chlorine and 0.1 wt. percent sulfur. It was used in the form of 1/16" particles having an apparent bulk density of about 0.52 g./ml., a pore volume of about 0.35 cc./g. and a surface area of about 160 m.$^2$/g.

As in Example I, the catalyst was loaded into a conventional three reactor continuous reforming plant which was operated in the conventional manner. There was one significant difference between the operation here and that given in Example I in that a recycle gas dryer was utilized in this case to remove essentially all water from the recycle hydrogen stream. This recycle gas dryer was utilized throughout the course of the run; that is, both during the water exclusion and during the water inclusion portion thereof.

The charge stock was an Arabian naphtha having an initial boiling point of 160° F., an end boiling point of 320° F., a paraffin content of 68 volume percent, a naphthene content of 25 volume percent and an aromatic content of 7 volume percent. Thus, its total cyclic content was 32 volume percent, and it is, accordingly, classified as a relatively lean charge stock. As in the first example, this charge stock was treated in a conventional hydrotreating plant to reduce the amounts of oxygen, sulfur and nitrogen contained therein to less than 1 wt. p.p.m. in each case. In addition, the charge stock was dried prior to passage into the plant. As a result of these preliminary steps, the amount of water or water-producing compound contained in the charge stock was less than 1 wt. p.p.m. of equivalent water.

The reforming plant was then started up and lined out at the following conditions: a pressure of 155 p.s.i.g., a LHSV of 1.4 hr.$^{-1}$, a hydrogen to hydrocarbon mole ratio of 7:1, and at an average inlet temperature to the reactors which was continuously selected to yield a $C_5^+$ reformate having an F-1 clear octane number of 98.

After the plant was lined out at these conditions, a determination of the total amount of water or water-producing compound continuously entering the reforming zone indicated that it was less than that equivalent to 1 wt. p.p.m. of the charge stock. In addition, propylene dichloride was continuously added to the charge stock in an amount of about 0.25 to about 1.5 wt. p.p.m.

Operation, as described, was conducted for a first period corresponding to a catalyst life of 30 barrels of charge per pound of catalyst (i.e. 5.25 months at a space velocity of 1.4) with the following results: an average $C_5^+$ reformate yield of about 77 volume percent of charge, an average hydrogen purity in the recycle hydrogen stream of about 73 mole percent, an average net hydrogen separator gas make of about 1200 standard cubic feet per barrel of charge (s.c.f.b.) and an average stabilizer overhead gas make of about 60 s.c.f.b.

At a catalyst life of about 30 barrels of charge per pound of catalyst, the $C_5^+$ yield had fallen to an unacceptable level of about 69 volume percent of charge and was declining at an accelerated rate. In addition, hydrogen purity had fallen to a level of about 65% and separator gas make had declined to a level of about 1000 s.c.f.b. On the other hand, stabilizer overhead gas make was increasing rapidly to a value of about 75 s.c.f.b.

At this point, water was continuously added to the charge stock in an amount of 15 wt. p.p.m. Because there was recycle gas drying in this plant, the total amount of water entering the reforming zone was equal to the amount added to the charge stock.

The effects of water addition in this case were an immediate increase in $C_5^+$ yield to about 75 volume percent, a marked jump in hydrogen purity of about 10 mole percent, an increase in separator gas make to about 1200 s.c.f.b., a decrease in stabilizer overhead gas make to about 50 s.c.f.b. and a sharp increase in $C_5^+$ yield stability.

Hence, it can be seen from the results reported in Examples I and II that the two-step operation of the present invention is highly beneficial in stabilizing and extending the preferred performance of this platinum-rhenium catalyst.

It is intended to cover by the following claims, all changes and modifications of the disclosed invention that would be self-evident to someone of ordinary skill in the catalytic reforming art.

I claim as my invention:

1. A process for catalytically reforming a relatively lean hydrocarbon charge stock boiling in the gasoline range, said process comprising the steps of:
   (a) contacting the charge stock, hydrogen and a halogen or a halogen-containing compound, in an essentially water-free reforming zone, with a highly selective reforming catalyst, comprising a combination of a platinum group component, a rhenium component and a halogen component with an alumina carrier material, at reforming conditions selected to produce a high octane $C_5^+$ reformate, a hydrogen stream and a debutanizer overhead gas stream, said halogen or halogen-containing compound being present in an amount corresponding to about 0.1 to about 5 wt. p.p.m. of the charge stock, calculated on an elemental halogen basis, said water-free condition being maintained until the selectivity of the catalyst decreases to an unacceptable value; and, thereafter,
   (b) continuously adding water or a water-producing compound to the reforming zone in an amount corresponding to about 5 to about 50 wt. p.p.m. of the hydrocarbon charge stock, calculated on an $H_2O$ basis, while continuing said contacting, thereby increasing the selectivity of the catalyst and enabling the reforming operation to continue for an additional substantial period of time at a relatively high $C_5^+$ yield.

2. A process as defined in claim 1 wherein the relatively lean charge stock contains less than 50 vol. percent of naphthenes and aromatics.

3. A process as defined in claim 1 wherein the halogen or halogen-containing compound is chlorine or a chlorine-containing compound.

4. A process as defined in claim 1 wherein the halogen-containing compound is an alkyl chloride.

5. A process as defined in claim 1 wherein the catalyst contains, on an elemental basis, about 0.1 to about 1.5 wt. percent halogen, about 0.05 to about 1 wt. percent platinum group metal and about 0.05 to about 1 wt. percent rhenium.

6. A process as defined in claim 1 wherein the platinum group component of the reforming catalyst is platinum or a compound of platinum.

7. A process as defined in claim 1 wherein the halogen component of the reforming catalyst is chlorine or a compound of chlorine.

8. A process as defined in claim 1 wherein the catalyst contains the platinum group component and the rhenium component in amounts sufficient to result in an atomic ratio of platinum group metal to rhenium of about 1:1 to about 5:1.

9. A process defined in claim 1 wherein the water-producing compound added in step (b) is an alcohol.

10. A process as defined in claim 1 wherein the catalyst comprises a combination of a platinum component, a chlorine component and a rhenium component with a gamma-alumina carrier material in amounts sufficient to result in the catalyst containing, on an elemental basis, about 0.05 to about 1 wt. percent platinum, about 0.05 to about 1 wt. percent rhenium and about 0.4 to about 1.25 wt. percent chlorine.

11. A process as defined in claim 1 wherein the total amount of water or water-producing compounds entering the reforming zone during step (a) is maintained less than that equivalent to 2 wt. p.p.m. of $H_2O$ in the charge stock.

12. A process as defined in claim 1 wherein the selectivity decrease of the catalyst is measured by monitoring the increase in debutanizer overhead gas make.

13. A process as defined in claim 12 wherein the unacceptable selectivity value is about 150% or more of the value of debutanizer overhead gas make at the start of step (a).

14. A process as defined in claim 1 wherein the selectivity decrease of the catalyst is measured by monitoring the decrease in purity of the hydrogen product stream.

15. A process as defined in claim 14 wherein the unacceptable selectivity value corresponds to a hydrogen purity of about 95% or less of the value of hydrogen purity at the start of step (a).

16. A process as defined in claim 1 wherein the selectivity decrease of the catalyst is measured by monitoring the decrease in net hydrogen production.

17. A process as defined in claim 1 wherein the unacceptable selectivity value corresponds to a value of net hydrogen production of about 95% or less of the net hydrogen production at the start of step (a).

References Cited

UNITED STATES PATENTS 3,617,522  11/1971  Schrepfer  208—138

HERBERT LEVINE, Primary Examiner

U.S. Cl. X.R.

208—138